United States Patent Office 3,314,101
Patented Apr. 18, 1967

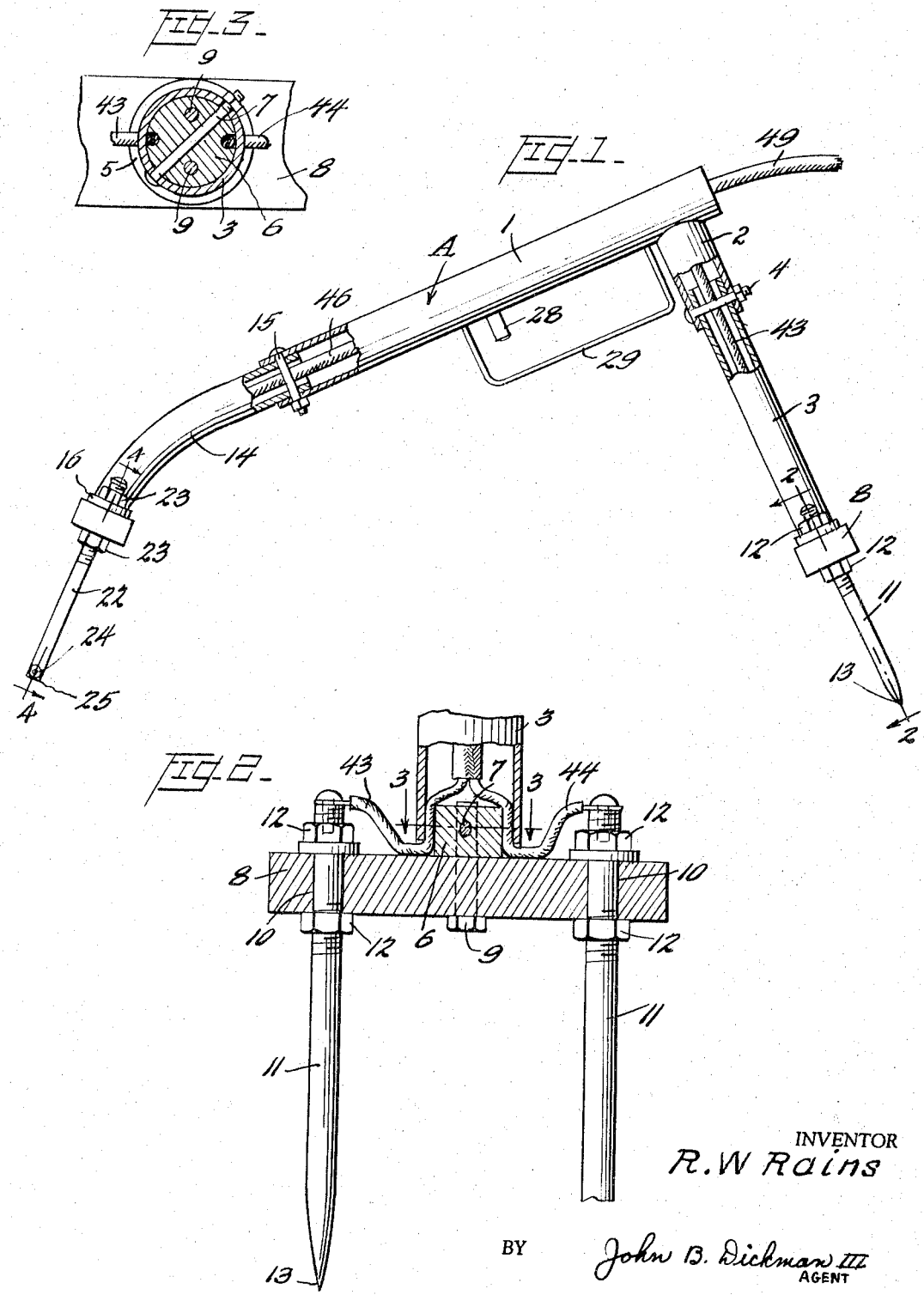

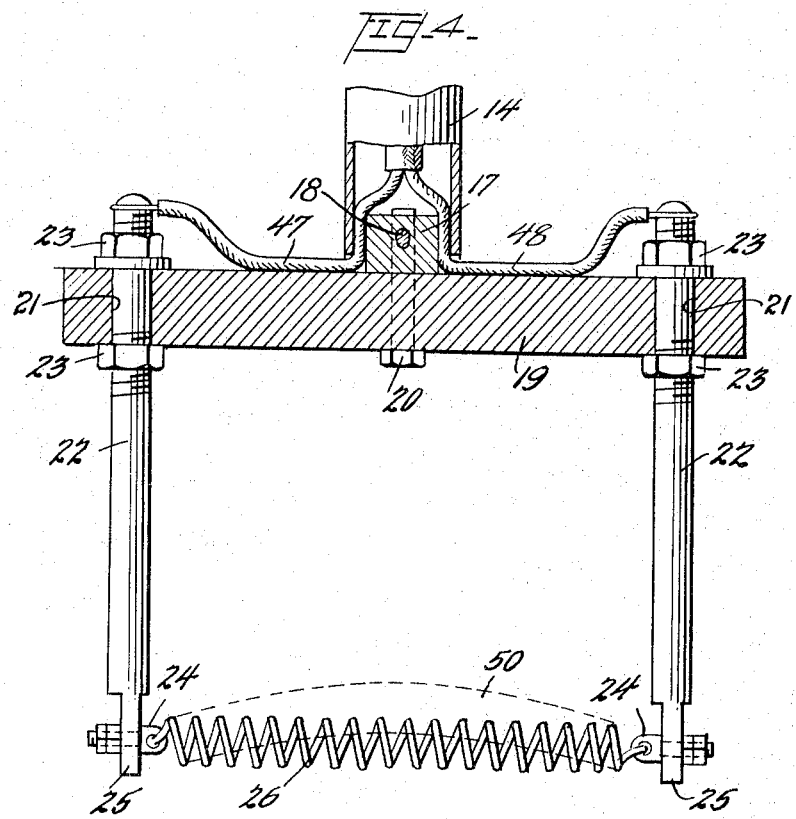
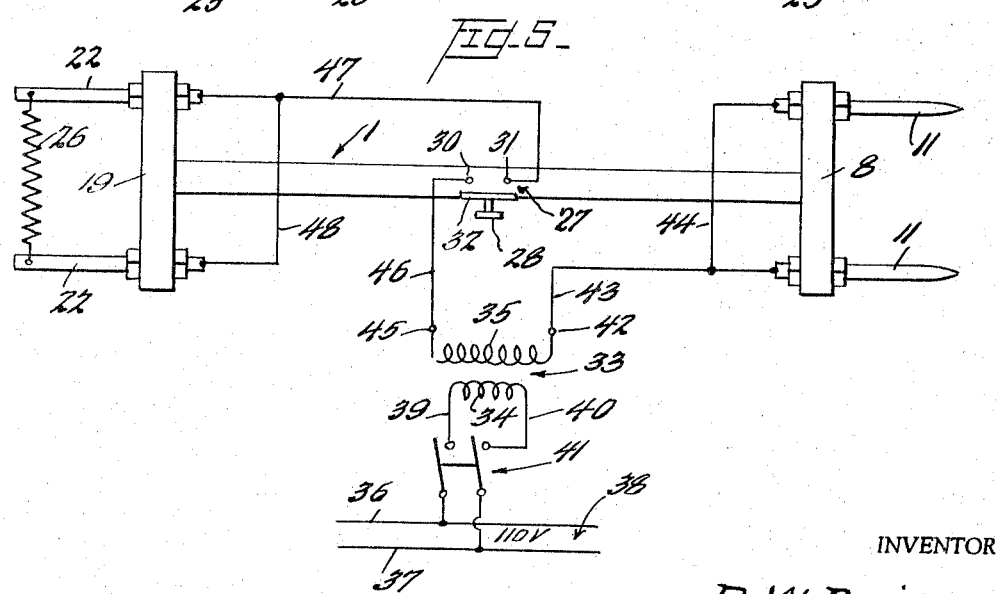

3,314,101
APPLICATOR FOR USE IN ELECTRICALLY
STUNNING ANIMALS
Richard W. Rains, Timonium, Md., assignor to Schluderberg-Kurdle Co., Inc., Baltimore, Md., a corporation of Maryland
Filed July 1, 1965, Ser. No. 468,694
4 Claims. (Cl. 17—1)

This invention relates generally to an apparatus for use in electrically stunning animals prior to slaughtering. More specifically, the invention relates to a manually manipulatable applicator by which a stunning voltage is applied to an animal.

In the electrical stunning of animals the general practice is to apply an electrode to the head of an animal and another electrode to the back of the animal at a point spaced a substantial distance from the head of the animal. A stunning voltage is then passed between the electrodes through the brain and back of the animal which renders it unconscious. The electrodes, which are generally secured to an elongated body or handle member in properly spaced relation to each other, comprise sharp pointed metal prongs. In order to secure the necessary good contact with the animal the electrodes are forced against the animal until the sharp pointed ends thereof pierce the animal's hide. The pierced section of the animal, especially on the back thereof, must be cut away thereby wasting meat and damaging the hide of the animal, all of which requires considerable time and labor. Also the electrodes must be replaced as the sharp points thereof become dulled by use, or the points must be constantly resharpened.

It is therefore the principal object of the invention to provide a manually manipulatable applicator for applying a stunning voltage to an animal in which the electrodes thereof are so constructed and arranged as to provide a good electrical contact with an animal without piercing the hide thereof, and thereby eliminate all wasting of meat, damaging of hides, and replacing or sharpening of electrodes.

Another object of the invention is to provide an applicator of the aforesaid character which is of simple durable construction, easily handled, and is inexpensive to manufacture.

To this end the applicator comprises an elongated tubular body or handle section having a pair of spaced downwardly extending tubular arms secured thereto, one adjacent each end thereof. A first electrode means, which is adapted to be applied to the head of an animal, is secured to the lower end of one of the arms, and a second electrode means, which is adapted to be applied to the back of an animal, is secured to the lower end of the other arm. The first electrode means comprises a transversely disposed block of insulating material, which is secured to the lower end of one of the arms, and a pair of spaced parallel metal prongs which are secured to the block and extend downwardly therefrom. The second electrode means comprises a transversely disposed similar block of insulating material which is secured to the lower end of the other arm. A pair of spaced parallel metal rods are secured to the block and extend downwardly therefrom. A resilient helically coiled wire spring is connected to and between the lower free ends of the rods. A pair of conductors, which extend through the tubular body and arms, are provided to connect the first electrode means and the second electrode means to the opposite sides respectively of an electrical source. A switch, which is mounted in the tubular body, is interposed in one of the conductors.

Having stated the principal objects of the invention, other and more specific objects thereof will be apparent from the following specification and the accompanying drawings, forming a part thereof, in which:

FIGURE 1 is a side elevation, partially broken away, of an applicator, constructed according to my invention, which is adapted to be manually applied to an animal for imparting a stunning voltage thereto;

FIG. 2 is an enlarged vertical section taken on the line 2—2 of FIG. 1;

FIG. 3 is a horizontal section taken on the line 3—3 of FIG. 2;

FIG. 4 is an enlarged vertical section taken on the line 4—4 of FIG. 1; and

FIG. 5 is a diagrammatic view showing the manner in which the applicator is connected to a voltage source.

Having generally described the invention, it will now be specifically described in connection with the drawings with the use of reference characters in which the letter A indicates generally an applicator constructed according to my invention which comprises, an elongated tubular body or handle member 1 having a downwardly extending sleeve 2 secured thereto adjacent the rear end thereof. The upper end of a downwardly extending tubular arm 3 is secured within the lower end of the sleeve 2 by a pin 4. The lower end of the arm 3, which is provided with an annular flange 5 about the lower end thereof, has a plug 6 secured therein by a pin 7. An elongated transversely extending rectangular block 8 of insulating material is secured to the lower end of the arm 3 by a pair of bolts 9 which extend upwardly through the block 8, intermediate the ends thereof, and are threaded into the plug 6.

The block 8 is provided with a pair of vertically disposed apertures 10, one adjacent each end thereof, in which the upper threaded ends of a pair of similar elongated downwardly extending cylindrical electrodes 11, are secured by nuts 12. The lower free ends of the anodes 11 are provided with sharp points 13.

The upper rearward end of a forwardly and downwardly inclined arm 14 is secured in the forward end of the tubular body or handle member 1 by a pin 15. The lower forward end of the arm 14, which is provided with an annular flange, has a plug 17, similar to the plug 6, secured therein by a pin 18. An elongated transversely extending rectangular block 19 of insulating material, similar to the block 8, is secured to the lower forward end of the arm 14 by bolts 20 which extend upwardly through the block 19, intermediate the ends thereof, and are threaded into the plug 17.

The block 19 is provided with a pair of vertically disposed apertures 21, one adjacent each end thereof, in which the upper threaded ends of a pair of similar elongated cylindrical downwardly extending metal rods 22 are secured by nuts 23. An eye-headed bolt 24 is secured in the lower flattened end 25 of each of the rods 22. A resilient helically coiled spring 26, of flexible wire, which is connected to and between the opposed eye-bolts 24, constitutes another electrode.

A normally open push button switch 27, which is mounted within the body member 1, is provided with an actuating button 28 which extends downwardly out from the body member 1 within the confines of a finger guard 29 which is secured to and extends downwardly from the body member 1. The switch 27, through which the electrodes 11 and 26 are connected to a source of high voltage stunning current, comprises a pair of contacts 30 and 31, and a bridging bar 32 to which the actuating push button 28 is connected.

As shown in FIG. 5 the high voltage current source comprises a step-up transformer 33 having a primary winding 34 and a secondary winding 35. The primary winding 34 is connected between the sides 36 and 37 respectively of a commercial 110 volt line 38 by a pair of conductors 39 and 40 having a double pole switch 41 interposed therein. The terminal 42 of the secondary winding 35 is connected to the electrode 11 by the conductor 43 and a branch conductor 44; and the other terminal 45 of the secondary winding 35 is connected to the contact 30 of the switch 27 by a conductor 46. The contact 31 of the switch 27 is connected to the electrode spring 26 through the conductor 47, branch conductor 48, and the rods 22.

When the applicator is applied to an animal with the electrodes 11 in contact with the head of the animal and the electrode spring 26 in contact with the back of the animal, and the switch 27 closed, the high voltage current, induced in the secondary winding 35 of the transformer 33 by the closing of the switch 27, will flow from the terminal 42 of the winding 35 through the conductors 43 and 44 to the electrodes 11, then through the brain and back of the animal to the electrode spring 26, and from there back to the terminal 45 of the winding 35 through the rods 22, conductors 47 and 48, switch 27, and conductor 46. The conductors 43 and 46 are incorporated in a cable 49 which is inserted into the tubular handle member 1 through the open rear end thereof.

When applying the applicator A to an animal the electrode spring 26 is first pressed tightly down against the back of the animal until it flexes throughout the length thereof into conformity with and engages the animal's back as indicated by the dotted lines 50 in FIG. 4. It is then moved along the animal's back to comb the hair of the animal up between the convolutions of the spring and thereby establish a firm electrical contact between the spring 26 and the back of the animal without injury to the hide of the animal. The electrodes 11 are then pressed down into engagement with the animal's head. Then when the switch 27 is manually closed the stunning voltage will flow between the electrodes 11 and the electrode spring 26 through the brain and back of the animal as long as the switch 27 is maintained closed.

From the foregoing it will be apparent to those skilled in this art that I have provided a very simple and effective device for accomplishing the objects of the invention.

It is to be understood that I am not limited to the specific construction shown and described herein as various modifications may be therein within the spirit of the invention and the scope of the appended claims.

What is claimed is:

1. An applicator for applying a stunning voltage to an animal, prior to slaughtering, said applicator comprising: an elongated body section, a pair of longitudinally spaced arms which are secured to said body section and extend downwardly therefrom, a first electrode means secured to the lower end of one of said arms, and a second electrode means secured to the lower end of the other of said arms; said first electrode means comprising a block of insulating material which is secured to the lower end of one of said arms, a pair of spaced metal rods which are secured to and extend downwardly from said block, and a helically coiled spring wire secured to and between the lower ends of said rods; conductor means by which one side of an electrical source is adapted to be connected to said first electrode means and the other side of said electrical source is adapted to be connected to said second electrode means, and a switch which is interposed in said conductor means; said first electrode means and said second electrode means being adapted to be applied to selected spaced apart sections of an animal's body.

2. An applicator as defined by claim 1 in which said second electrode means comprises another block of insulating material which is secured to the lower end of the other of said arms and a pair of spaced sharp pointed conductor prongs which are secured to and extend downwardly from said other block.

3. An applicator as defined by claim 1 in which said body section and said arms comprise elongated tubular members through which said conductor means extends for connection to said first electrode means and said second electrode means, and in which said switch is mounted in said body section.

4. An applicator for applying a stunning voltage to an animal prior to slaughtering, said applicator comprising: an elongated tubular body, a first elongated tubular arm which is secured to said body adjacent one end thereof and extends downwardly therefrom, a first electrode means secured to the lower end of said first arm, a second elongated tubular arm which is secured to the other end of said body and is inclined downwardly therefrom, a second electrode means which is secured to the lower end of said second arm; said first electrode means comprising a first block of insulating material which is secured to the lower end of said first arm, and a pair of spaced metal prongs which are secured to and extend downwardly from said first block; said second electrode means comprising, a second block of insulating material which is secured to the lower end of said second arm, a pair of spaced metal rods which are secured to and extend downwardly from said second block, and a helically coiled spring wire which is secured to and between the lower ends of said rods; conductor means by which said first electrode means is adapted to be connected to one side of an electrical source and said second electrode means is adapted to be connected to the other side of said electrical source, said conductor means extending through said tubular body and arms for connection to said electrode means, and a switch which is mounted in said body and is interposed in said conductor means; said first electrode means and said second electrode means being adapted to be applied to selected spaced apart sections of an animal's body.

References Cited by the Examiner

UNITED STATES PATENTS

| 1,935,138 | 11/1933 | Windisch | 17—1 |
| 3,258,811 | 7/1966 | Braun | 17—1 |

FOREIGN PATENTS

| 532,368 | 8/1931 | Germany. |
| 315,962 | 7/1929 | Great Britain. |

LUCIE H. LAUDENSLAGER, *Primary Examiner.*